(12) United States Patent
Sherry et al.

(10) Patent No.: US 10,002,145 B2
(45) Date of Patent: *Jun. 19, 2018

(54) DECLARING DIRECTIVES IN A DATA STORE

(71) Applicant: EMC IP Holding Company LLC, Hopkinton, MA (US)

(72) Inventors: Gavin John Sherry, San Mateo, CA (US); Caleb E. Welton, Foster City, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 42 days.

This patent is subject to a terminal disclaimer.

(21) Appl. No.: 15/096,978

(22) Filed: Apr. 12, 2016

(65) Prior Publication Data

US 2016/0224599 A1   Aug. 4, 2016

Related U.S. Application Data

(63) Continuation of application No. 13/529,740, filed on Jun. 21, 2012, now Pat. No. 9,342,518.

(51) Int. Cl.
*G06F 7/00* (2006.01)
*G06F 17/00* (2006.01)
*G06F 17/30* (2006.01)

(52) U.S. Cl.
CPC .. *G06F 17/30312* (2013.01); *G06F 17/30038* (2013.01)

(58) Field of Classification Search
CPC ......... G06F 17/30563; G06F 17/30864; G06F 17/30979; G06F 17/30994; G06F 17/30038; G06F 17/30554; G06F 17/30522; G06F 17/30572; G06F 17/30643

See application file for complete search history.

(56) References Cited

U.S. PATENT DOCUMENTS

| | | | |
|---|---|---|---|
| 7,136,791 B2* | 11/2006 | Darwent | G06Q 10/10 703/6 |
| 7,719,443 B1* | 5/2010 | Natanzon | G06F 11/1471 341/50 |
| 2004/0225659 A1* | 11/2004 | O'Brien | G06F 17/30197 |
| 2013/0036101 A1* | 2/2013 | Marwah | G06F 17/30595 707/693 |
| 2014/0279526 A1* | 9/2014 | Jackson | G06Q 20/405 705/44 |

* cited by examiner

*Primary Examiner* — Susan Chen
(74) *Attorney, Agent, or Firm* — Van Pelt, Yi & James LLP

(57) ABSTRACT

A specified data type and pre-storage operation are receive. In response, an association between the two is created in storage metadata. After the association is created, data to be stored is received where the data has a data type. In response to receiving the data, the storage metadata, including the association, is accessed and it is determined if the data type of the data is the same as the specified one. If so, the specified pre-storage operation is automatically performed on the data in order to obtain an output and the output is stored.

12 Claims, 16 Drawing Sheets

|  | Column 1 (650) | Column 2 (652) | Column 3 (654) | Column 4 (656) |
|---|---|---|---|---|
|  | Integer Data Type | Integer Data Type | Integer Data Type | Binary Data Type |
| Row 1 / Role 1 | 000-00-0000 | AB0000 | (555) 555-0000 | Yes |
| Row 2 / Role 2 | 000-00-0001 | AB0001 | (555) 555-0001 | Yes |
| Row 3 / Role 3 | 000-00-0002 | AB0002 | (555) 555-0002 | Yes |
| Row 4 / Role 1 | 000-00-0003 | AB0003 | (555) 555-0003 | No |
| Row 5 / Role 2 | 000-00-0004 | AB0004 | (555) 555-0004 | No |
| Row 6 / Role 3 | 000-00-0005 | AB0005 | (555) 555-0005 | No |
|  | Social Security Numbers | Drivers License Numbers | Telephone Numbers | Comm. Prefs. |

- 600
- User-Defined Group (602)
- 604
- 608
- Partition 1 (606): Rows 1–3
- Partition 2 (607): Rows 4–6

FIG. 6

CREATE TYPE newtype (compresstype=quicklz, blocksize=65536, effortlevel=1); ← 1200

CREATE TABLE t1 (c1 newtype ENCODING (compresstype=zlib), c2 newtype); ← 1202

REPORT newtype; ← 1204

> quicklz, blocksize=65536, effortlevel =1 ← 1206

REPORT zlib; ← 1208

> c1 ← 1210

REPORT t1; ← 1212

> c1: zlib, blocksize=65536, effortlevel=1 ← 1214
c2: quicklz, blocksize=65536, effortlevel =1

FIG. 12

DECLARING DIRECTIVES IN A DATA STORE

CROSS REFERENCE TO OTHER APPLICATIONS

This application is a continuation of co-pending U.S. patent application Ser. No. 13/529,740, entitled DECLARING DIRECTIVES IN A DATA STORE filed Jun. 21, 2012 which is incorporated herein by reference for all purposes.

BACKGROUND OF THE INVENTION

In various applications, it may be desirable to perform a variety of operations on data prior to storage. For example, to conserve storage resources, it may be desirable to perform a compression operation on data prior to storage. A column of dates in raw form may be [Jan. 1, 2012; Jan. 1, 2012; Jan. 1, 2012; Jan. 1, 2012; Jan. 1, 2012]$^T$. The amount of storage required to store this column in raw form is greater than that for a run length encoded version (e.g., (Jan. 1, 2012; 4), where the first value is the pattern and the second value is the number of times the pattern is repeated after the first occurrence). It would be desirable if new storage systems were available which are easier to work with and/or produce better (e.g., compression) results.

BRIEF DESCRIPTION OF THE DRAWINGS

Various embodiments of the invention are disclosed in the following detailed description and the accompanying drawings.

FIG. 6 is a diagram showing an embodiment of a table showing logical containers of data with which a pre-storage operation may be associated.

FIG. 12 is a diagram showing an embodiment of a command line interface of a storage system.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
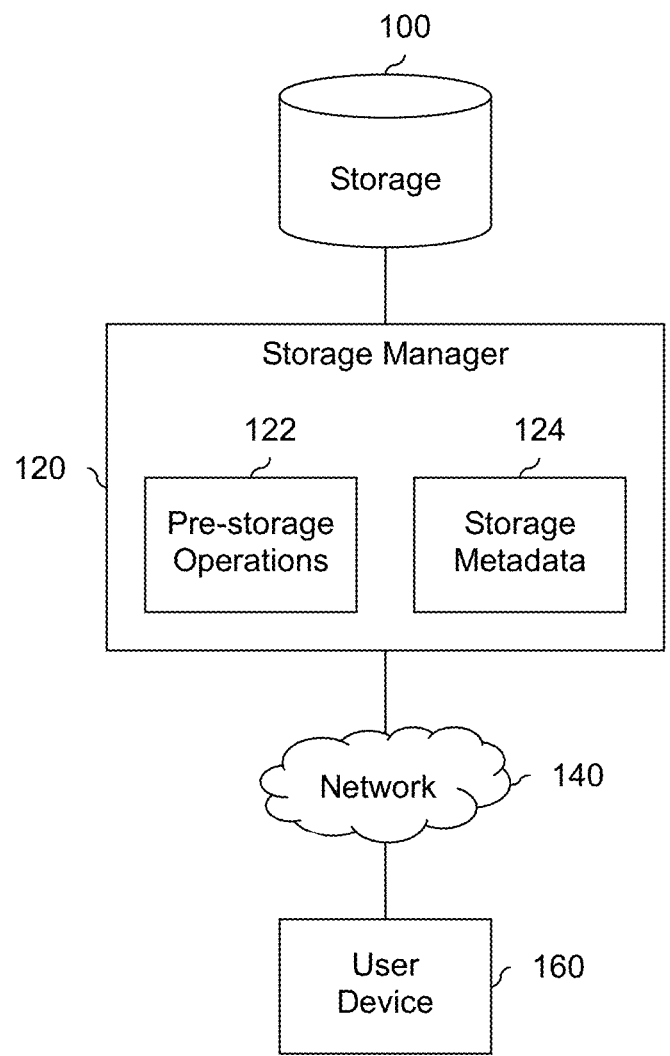
FIG. 1 is a diagram showing an embodiment of a storage system which permits a pre-storage operation to be associated with a set of data and performed on the data prior to storage.

FIG. 1 is a diagram showing an embodiment of a storage system which permits a pre-storage operation to be associated with a set of data and performed on the data prior to storage. In the example shown, a user accesses data stored on storage 100 via user device 160. In various embodiments, user device 160 is a computer, a smart phone, a tablet, etc. Via network 140, user device 160 is connected to storage manager 120.

Storage manager 120 includes pre-storage operations 122 and storage metadata 124. Storage metadata 124 is used by storage manager 120 to record associations between pre-storage operations and sets of associated data, both which are specified or otherwise defined by a user. A set of data may be defined at a variety of levels, including (but not limited to) data type, database, table, column, or partition. In some embodiments, a pre-storage operation is associated with a plurality of data objects in a database, such as a group of columns, or a group of tables. In some embodiments, a set of data is described or defined by some criteria, definition, or specification, such as having a certain value in a certain column or all columns starting with a certain name (e.g., all columns starting with "col", i.e., col*). In some embodiments, a set of data is defined or described using a physical container (e.g., by physical identifiers or physical parameters, such as all columns physically stored on removable magnetic tape versus on a storage area network), or at a logical container (e.g., by logical identifiers or parameters, such as a logical database which may be stored across multiple physical devices).

When data is received from a user for storage, storage manager 120 uses storage metadata 124 to determine the appropriate pre-storage operation to perform on the data. That pre-storage operation is then retrieved from pre-storage operations 122 and is then performed on the data. The output of the operation is then stored in storage 100. When the user indicates stored data is desired, the stored data (e.g., in compressed, encrypted, or error correction/detection encoded form) is retrieved from storage 100. Storage manager 120 then uses storage metadata 124 to determine the associated pre-storage operation and then performs the inverse of the pre-storage operation to recover the original data. The original data is then returned to the user.

A pre-storage operation may be any operation; some examples include compression operations (e.g., run length encoding, Lempel and Ziv Modified Compression Algorithm, zlib, QuickLZ, etc.), encryption (e.g., public-key encryption), and error correction or error detection coding (e.g., Hamming codes, Reed-Solomon codes, etc.). Some other example operations are related to compression-level, blocksize, and layout (e.g., column vs. row storage). In some embodiments, a pre-storage operation does not necessarily transform the data processed by the operation (e.g., the data input matches that data that is output). For example, an operation may be an auditing operation where data is sent to an auditing server which logs or tracks the data passed to it.

In one example, a user creates a data type called integer and associates it with a difference compression operation which transforms uncompressed data in the form (first value, second value, . . . , $n^{th}$ value, $n+1^{th}$ value) into (first value, (second value–first value), . . . , ($n+1^{th}$ value–$n^{th}$ value)). This association between the integer data type and the difference compression operation is stored in storage metadata 124 and the difference compression operation is stored in pre-storage operations 122.

Subsequently, a table is created with two columns, both of which are defined to store data of the integer data type. The first column of the table is used to store International Standard Book Number (ISBNs) of books. For the first column, the difference compression operation is appropriate for ISBNs because ISBN numbers tend to be large values (e.g., ISBN-10 is a 10-digit number and ISBN-13 is a 13-digit number) and they tend to be within a small range (e.g., only the last 3 or 4 digits vary for a given publisher). A difference compression operation may be one of the most efficient or compact ways of representing such information. The first column is of the integer data type, so it is automatically associated with the difference compression operation.

The second column of the table is used to store the publication dates of those same books and a difference compression operation may not be so well suited for that kind of data. Books are released only on certain days of the week (e.g., only on Tuesdays) and therefore the publication dates tend to have the same date repeated a number of times. A run length encoding operation may be better suited to such data. A user, with this knowledge, may declare an association between the second column and a run length encoding operation in the create statement used to create the table. Some examples of this are described in further detail below. This association is stored in storage metadata 124. Using these associations stored in storage metadata 124 (in this example, between the integer data type and a difference compression operation, as well as between the second column and a run length encoding operation), when publication dates are received for the second column, storage manager 120 determines that although the difference compression operation is a possible pre-storage operation (because the second column is of the integer data type), the run length encoding operation is the appropriate pre-storage operation to perform on the received data prior to storage in storage 100.

As is described above, in some cases, storage metadata 124 includes two or more possible pre-storage operations for some received data intended for storage. Prior to performing a pre-storage operation, storage manager 120 resolves precedence and determines which pre-storage operation is to be performed. In some embodiments, storage manager 120 resolves precedence according to a list where a pre-storage operation associated with a definition or specification of data at a smaller granularity tends to have higher precedence over one at a larger granularity or broader level. An example of this is described in further detail below.

As described in the above example, the techniques described herein permit a user to associate groups of data with compression operations that have the best compression performance for those types of data. This produces better compression results compared to a single compression operation applied to the entire database. Other performance benefits (e.g., not related to compression) may also be realized using the techniques described herein. For example, a user with knowledge of the data stored may know what type of encryption is appropriate for one set of data compared to another. Using the system described herein, a user is able to specify an encryption operation (or a stronger encryption operation) for credit card numbers and social security numbers and no encryption operation (or a weaker encryption operation) for less important information such as communication preferences.

Another advantage to the techniques described herein is that a definition or specification of a set of data on which a pre-storage operation is to be performed is able to span or encompass multiple pieces of data, including data which did not exist when the group was specified or defined. Referring back to the example of book information described above, suppose a third column (also of the integer data type) is subsequently added to the table. Using the example system described herein, the system would automatically associated the third column with the difference compression operation (e.g., without this being explicitly specified when the third column is created or inserted) because of the integer data type. Some other systems may only perform a pre-storage operation on data objects that existed at the time the association was defined. In such systems, subsequently creating a new data object which did not exist when the pre-storage operation was specified or declared may require the user to explicitly associate the operation with the newly-created data object. This may lead to additional and possibly unnecessary I/O exchanges.

Although some exemplary systems described herein show a single storage device (e.g., storage 100), in some embodiments the technique is used in a distributed storage system (e.g., with a master and a plurality of distributed nodes coupled to the master). Some features of the technique described herein make it attractive for use in distributed storage systems. For example, distributed storage systems may manage much more information than single device storage systems, so being able to fine tune (for example) compression operations on such a large amount of data may yield significant storage savings. Also, it may be important for distributed storage systems to keep the number of I/O exchanges between the master and distributed nodes relatively low, in order to not interfere with performance of the system. Distributed systems may, for example, distribute operations amongst the nodes, relying upon the parallel nature of the distributed nodes in order to provide acceptable service times for the large amount of data. Using the technique described herein to declare pre-storage operations for various sets of data may requires less I/O exchanges between the master and distributed nodes compared to some other techniques, which would interfere less with the performance of the system.

Figure 2:
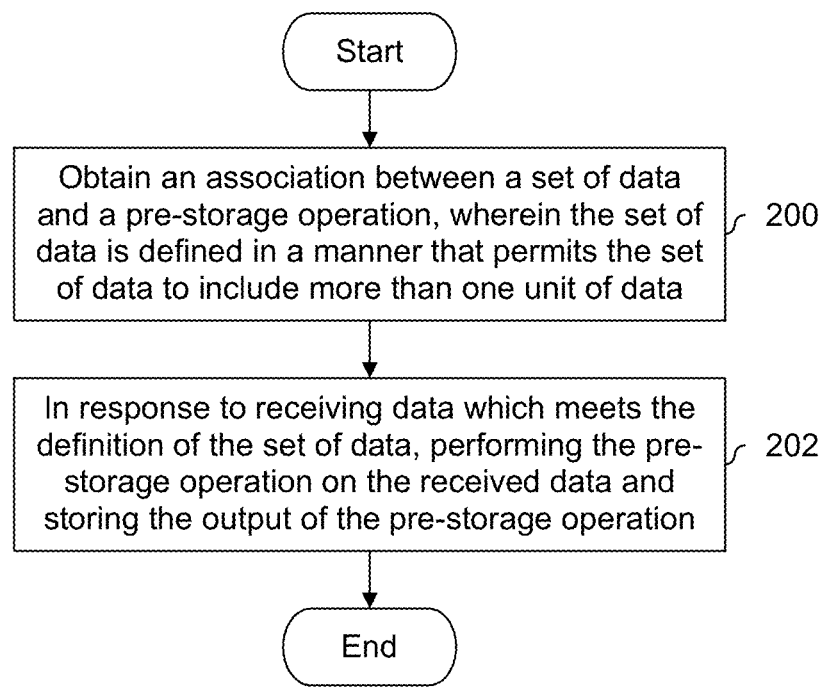
FIG. 2 is a flowchart illustrating an embodiment of a process for defining an association between a set of data and a pre-storage operation and performing the pre-storage operation on received data.

FIG. 2 is a flowchart illustrating an embodiment of a process for defining an association between a set of data and a pre-storage operation and performing the pre-storage operation on received data. In some embodiments, the process is performed by storage manager 120 in FIG. 1.

At 200, an association between a set of data and a pre-storage operation is obtained, wherein the set of data is defined in a manner that permits the set of data to include more than one unit of data. Some other systems, for example, only permit pre-storage operations to be performed on or associated with a single column within a table. To associate a pre-storage operation with each column would require the user to identify each pre-storage operation for each column, which would require many commands or I/O exchanges. In contrast, the technique described herein permits a user (if desired) to associate a pre-storage operation with a given data type (as an example), and anytime that data type is used, the data will be processed using the associated operation before being stored (assuming there is no other applicable pre-storage operations with a greater precedent).

At 202, in response to receiving data which meets the definition of the set of data, the pre-storage operation is performed on the received data and the output of the pre-storage operation is stored. In one example, ISBNs and publication dates intended to populate a table of book related information are received, and the appropriate pre-storage compression operation is performed and the compressed data is stored. In some cases there may some data for which there is no associated pre-storage operation and no operation is performed on such data before being stored.

In some embodiments, storage metadata 124 in FIG. 1 is updated between steps 200 and 202 to record the association between the set of data and pre-storage operation obtained at 200. In some embodiments, step 202 includes accessing storage metadata to determine an appropriate pre-storage operation to perform (e.g., based on defined precedents, what associations are stored in the storage metadata, etc.).

Figure 3:
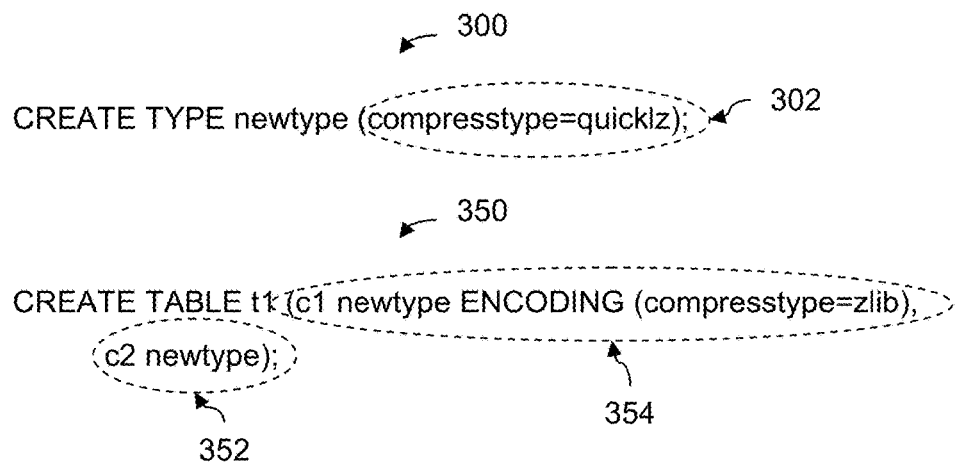
FIG. 3 is a diagram showing an embodiment of a create statement in which an association between a data type and a compression operation is declared.

FIG. 3 is a diagram showing an embodiment of a create statement in which an association between a data type and a compression operation is declared. In the example shown, create statement 300 is used to create a new data type called newtype. In this example, specification of a compression operation in a create type statement is optional (e.g., a user has the option of creating a data type and not associating it with a pre-storage operation) but the user has elected to specify this information. In some embodiments, storage metadata is updated to reflect the association between the QuickLZ operation and the newtype data type.

Create statement 350 occurs after create statement 300 and there may be any number of other statements between the two create statements. Create statement 350 creates a new table (i.e., table t1) which has two columns. The first column (i.e., c1) is of the data type newtype but also includes an explicit association with the zlib compression operation (see clause 354 of create statement 350). As such, even though column c1 is of the newtype data type (which is associated with the QuickLZ compression operation per clause 302 in create statement 300), column c1 is associated with the zlib compression operation because of clause 354. In this example at least, a pre-storage operation associated with an individual column (or a group of columns) has higher precedent compared to a pre-storage operation associated with a data type.

The second column in table t1 (i.e., c2) is also defined to be of the data type newtype (see clause 352 in create statement 350). Clause 352 does not include an explicit assignment of a pre-storage operation to c2, so column c2 is (e.g., automatically) associated with the QuickLZ compression operation because of the newtype data type. When data is received for column c2, it is compressed using the QuickLZ compression operation prior to storage.

Although this figure shows a create statement, other types of statements or commands may be used to define or update an association between a set of data and a pre-storage operation. Some examples of statements that may affect the pre-storage operations include ALTER TABLE ADD COLUMN (e.g., adding a new column can include addition of new pre-storage operations for the effected column), ALTER TABLE DROP COLUMN (e.g., removing existing columns can remove information about no longer applicable pre-storage operations), ALTER TABLE ALTER COLUMN SET TYPE (e.g., changing the datatype of a column can affect the pre-storage operations for the affected column), ALTER TABLE SET WITH (compresstype= . . . ) (e.g., explicitly changing the pre-storage operations for a table), ALTER TYPE SET DEFAULT ENCODING (compresstype= . . . ) (e.g., explicitly changing the pre storage operations for a type), etc. In various embodiments, a statement is associated with a schema, a tablespace, a storage device, a database, a role, a group of columns, a group of tables, a group of databases, etc. In various embodiments there are various mechanisms that can be employed to interact with the system to modify and/or augment the existing pre-storage metadata related to a particular data type, table, etc.

Figure 4:
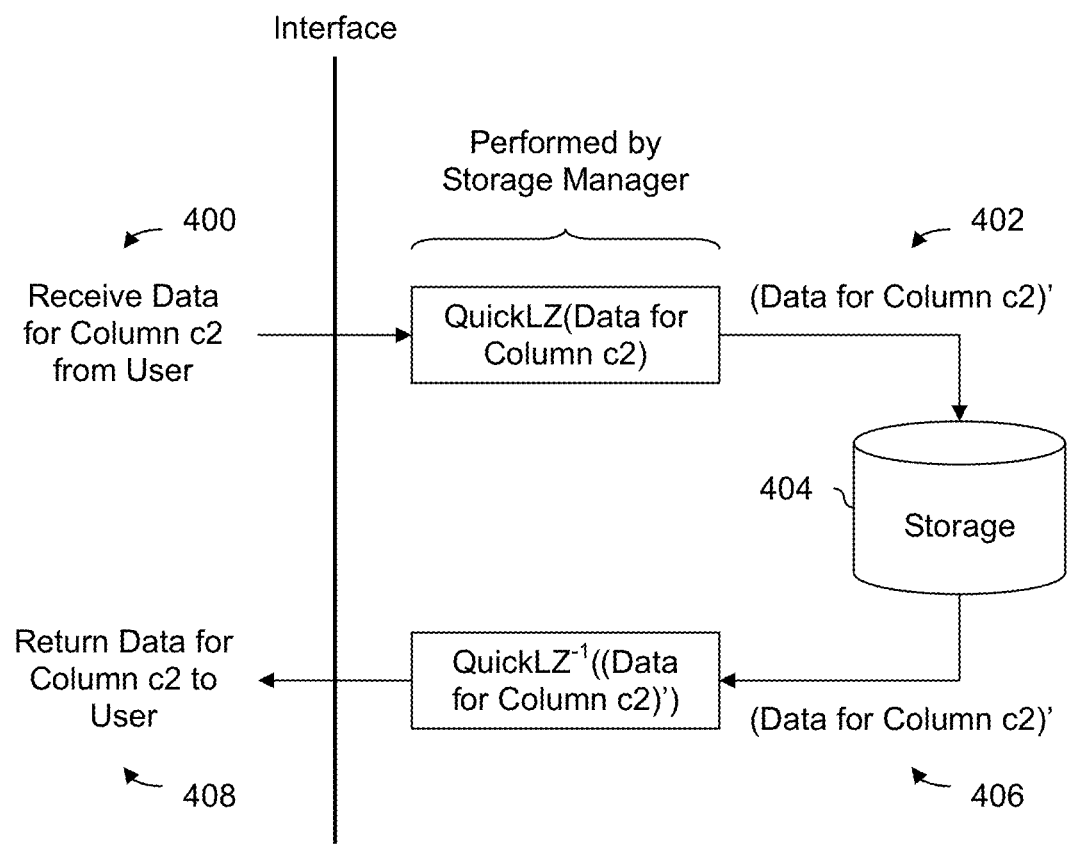
FIG. 4 is a diagram showing an embodiment of compression and decompression operations performed on data going to or coming from storage, respectively.

FIG. 4 is a diagram showing an embodiment of compression and decompression operations performed on data going to or coming from storage, respectively. This example is related to the example of FIG. 3. Data is received from a user for column c2 at 400. Referring back to FIG. 3, create statement 300 creates the newtype data type and associates that data type with the QuickLZ compression operation; clause 352 in table create statement 350 defines column c2 to be the newtype data type.

Column c2 is of the newtype data type and there are no other pre-storage operations with a higher precedent so the QuickLZ compression operation is performed on data for column c2 and compressed data (402) is output. This compression is performed by a storage manager. As used herein, data' indicates data that has been processed by some pre-storage operation. The compressed data (402) is stored in storage 404.

In response to a user request for the stored data, the compressed data (406) is retrieved from storage. For example, a user may want to view the information stored in the table, including the contents of column c2. The compressed data is processed using the inverse of the QuickLZ operation to restore the original data. As used herein, $f^{-1}(\bullet)$ is the inverse function of the function $f(\bullet)$. In some embodiments, a storage manager accesses storage metadata to determine the appropriate (inverse) operation to perform on the retrieved data 406 in order to restore the original data. The uncompressed, restored data (408) is then returned to the user. Although this example shows a compression operation, the basic technique is applicable to other types of pre-storage operations.

Figure 5:
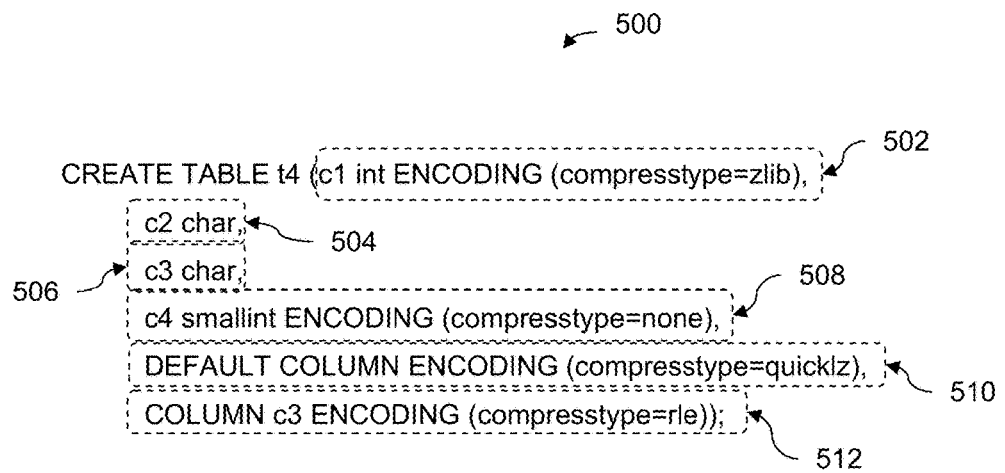
FIG. 5 is a diagram showing an embodiment of a create statement which includes a default compression clause and a clause preventing a compression operation from being associated with a column.

FIG. 5 is a diagram showing an embodiment of a create statement which includes a default compression clause and a clause preventing a compression operation from being associated with a column. In the example shown, create statement 500 creates a table t4 which includes 4 columns. Clause 502 associates the compression operation zlib with column c1. Clause 504 contains no explicit or direct association with a compression operation and therefore column c2 inherits its compression operation (i.e., QuickLZ) from default clause 510. Clause 506 does not include any direct or explicit association with a compression operation for column c3; column c3 therefore inherits its association with a run length encoding (RLE) compression operation via clause 512 (i.e., "COLUMN c3 ENCODING (compresstype=rle)). The user does not want column c4 to be compressed and accomplishes this by defining the compression operation to be none (i.e., "compresstype=none") in clause 508. This permits column c4 to ignore the default compression type (i.e., QuickLZ set via clause 510) and data in column c4 will not be compressed prior to storage.

FIG. 6 is a diagram showing an embodiment of a table showing logical containers of data with which a pre-storage operation may be associated. In the example shown, table 600 includes 4 columns. Column 650 includes social security numbers and is an integer data type. Column 652 includes drivers license numbers and is an integer data type. Column 654 includes telephone numbers and is an integer data type. Column 656 includes communication preferences (e.g., whether a person is on a mailing list or not) and is a binary data type.

Table 600 shows a variety of logical containers and for which a pre-storage operation may be associated or defined. In some embodiments, a pre-storage operation is associated with a user-defined group of columns, such as 602. For example, a user may know that although columns 650, 652 and 654 are all the same data type (i.e., "integer"), column 650 contains social security numbers and column 652 contains drivers license numbers and they therefore should be protecting using very strong encryption codes, whereas column 654 (which includes telephone numbers) does not need to be protected to the same degree. In some embodiments, a user-defined group of columns is defined by column name and/or by column contents.

In some embodiments, a pre-storage operation is associated with a particular data type, such as the integer data type 604. In some embodiments, a set of data is defined by or specified by a partition. In this example, a first partition (606) is defined to be those rows for which the fourth column (656) has a value of "Yes," and a second partition (607) is those rows with a value of "No." In some embodiments, a set of data is defined by a role. Some examples of roles include: administrators (e.g., who have permissions to make all changes in a database, including defining data types), contributors (e.g., who are permitted to pass content to a database for storage, such adding new social security numbers or changing social security numbers in table 600), or reviewers (e.g., who are permitted to access table 600 but are not permitted to change content or add content in table 600). In some embodiments, a role is associated with an owner or source of data. In some embodiments, a role is referred to as a user.

Figure 7:
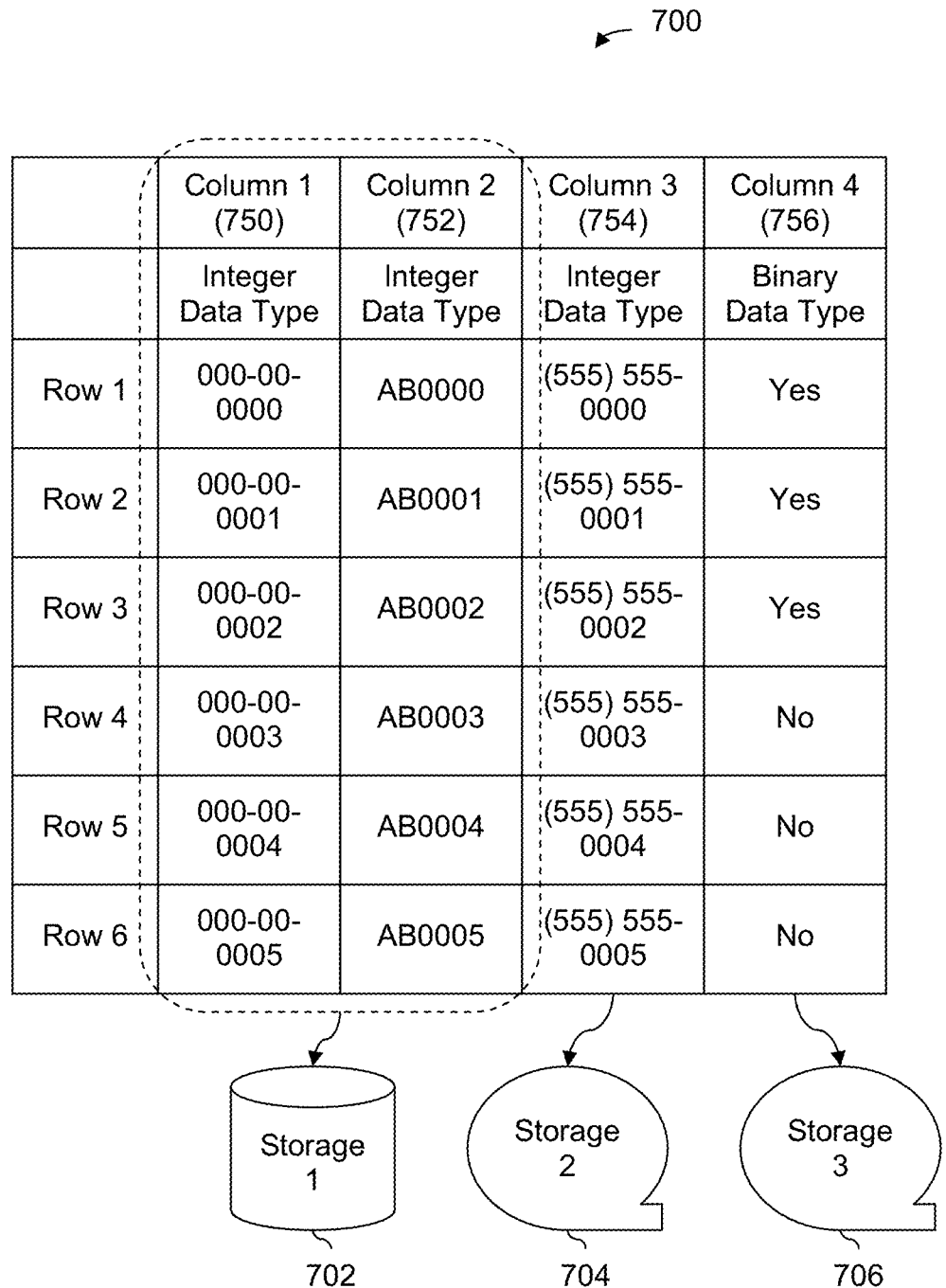
FIG. 7 is a diagram showing an embodiment of a table showing physical containers with which a pre-storage operation may be associated.

FIG. 7 is a diagram showing an embodiment of a table showing physical containers with which a pre-storage operation may be associated. In the example shown, columns 750 and 752 of table 700 are stored in storage 702, which is of a first storage type (e.g., hard disk drive storage). Columns 754 and 756 of table 700 are stored in storage 704 and 706, respectively, which is of a second storage type (e.g., magnetic tape storage). In some embodiments, a pre-storage operation is associated with a set of data depending upon a storage device. For example, all data stored on storage device 702 is associated with a particular pre-storage operation. In some embodiments, all data stored on a certain type of storage device is associated with a particular pre-storage operation. For example, all data stored on magnetic tape storage (i.e., columns 754 and 756 in this example), are associated with a given pre-storage operation.

In some cases, a pre-storage operation is associated with a set of data defined by or specified based on physical identifiers or characteristics in order to accommodate different characteristics of different types of storage. For example, information stored on magnetic tape may decay differently over time compared to the same information stored on hard disk drive and it may be desirable to use different error correction codes which are best suited for those decay characteristics. In some cases, some types of storage are more readily available and/or less expensive than other types of storage and it may be desirable to use stronger/weaker compression operations depending upon the cost or availability of different types of storage. In some cases, high performance data (e.g., for which an access time is guaranteed) is stored on certain devices (e.g., storage 704) and lower performance data (e.g., for which is there is no access time guarantee or a slower guaranteed access time) is stored on other devices (e.g., storage 706). In some embodiments, pre-storage operations are selected to take into consideration the amount of processing time required to perform an inverse operation (e.g., decompress compressed data, decrypt encrypted data, etc.) so that the total access time satisfies a guaranteed access time.

The logical and physical containers shown herein are merely exemplary and are not intended to be limiting. A set of data may be specified or defined according to logical and/or physical containers other than those shown herein. For example, a database may include a plurality of tables, and a logical container may be a user-defined group of tables or a single table within the database.

Figure 8:
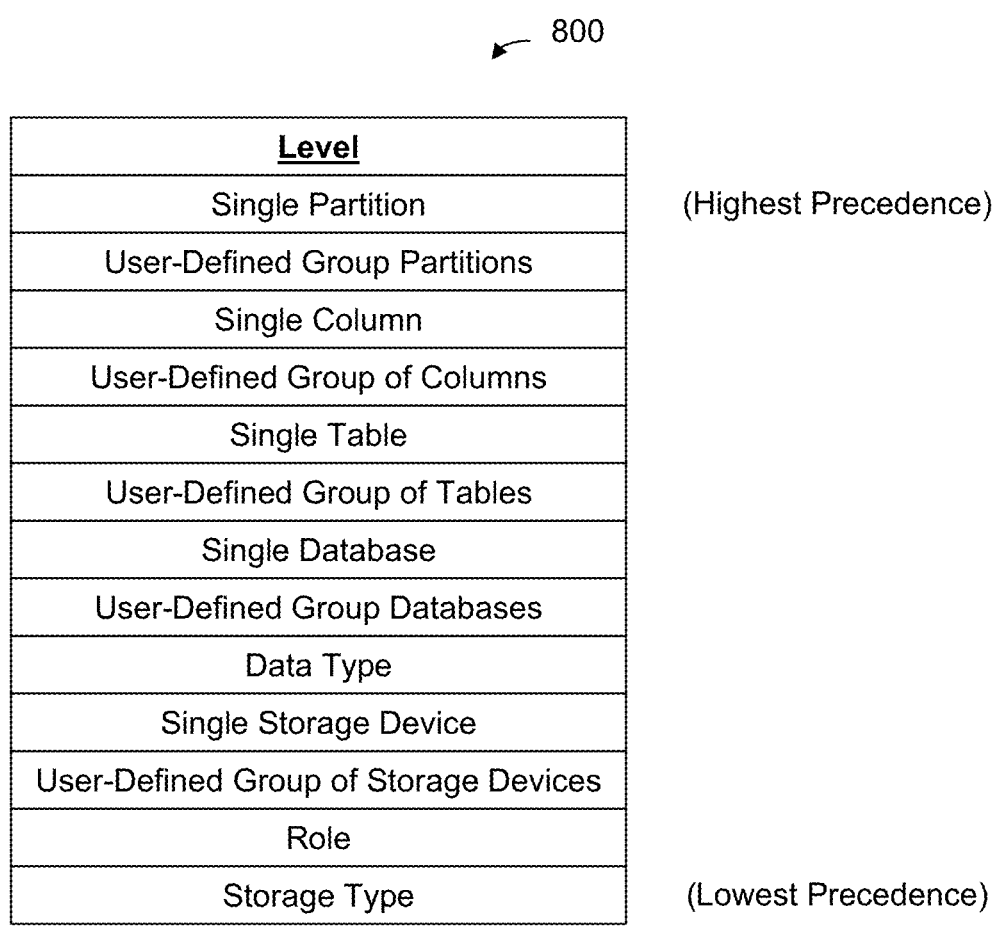
FIG. 8 is a diagram showing an embodiment of an order of precedence.

FIG. 8 is a diagram showing an embodiment of an order of precedence. In the example shown, order of precedence 800 is used by a storage manager to determine which pre-storage operation to perform on received data intended for storage. In the example shown, order of precedence 800 includes various logical or physical containers for data or associations data may have. In order to resolve all possible combinations, in some embodiments an order of precedence includes all levels of definition (e.g., all levels of definition actually used/defined or all possible levels, including those not actually used in a definition). In this example, the order of precedence from highest precedence to lowest precedence is: single partition, user-defined group of partitions, single column, user-defined group of columns, single table, user-defined group of tables, single database, user-defined group of databases, data type, single storage device, user-defined group of storage devices, role, and storage type. In this example, a pre-storage operation associated with a definition or specification of data at a smaller granularity tends to have higher precedence over one at a larger granularity or broader level. In some embodiments, precedence is resolved at object creation time. In one example, the encoding declarations are resolved down to the level of each column for each data partition. Although this may result in storage of redundant data, in at least this example the data is accessed through a b-tree data structure so that it can be retrieved at run time at high speed.

Figure 9:
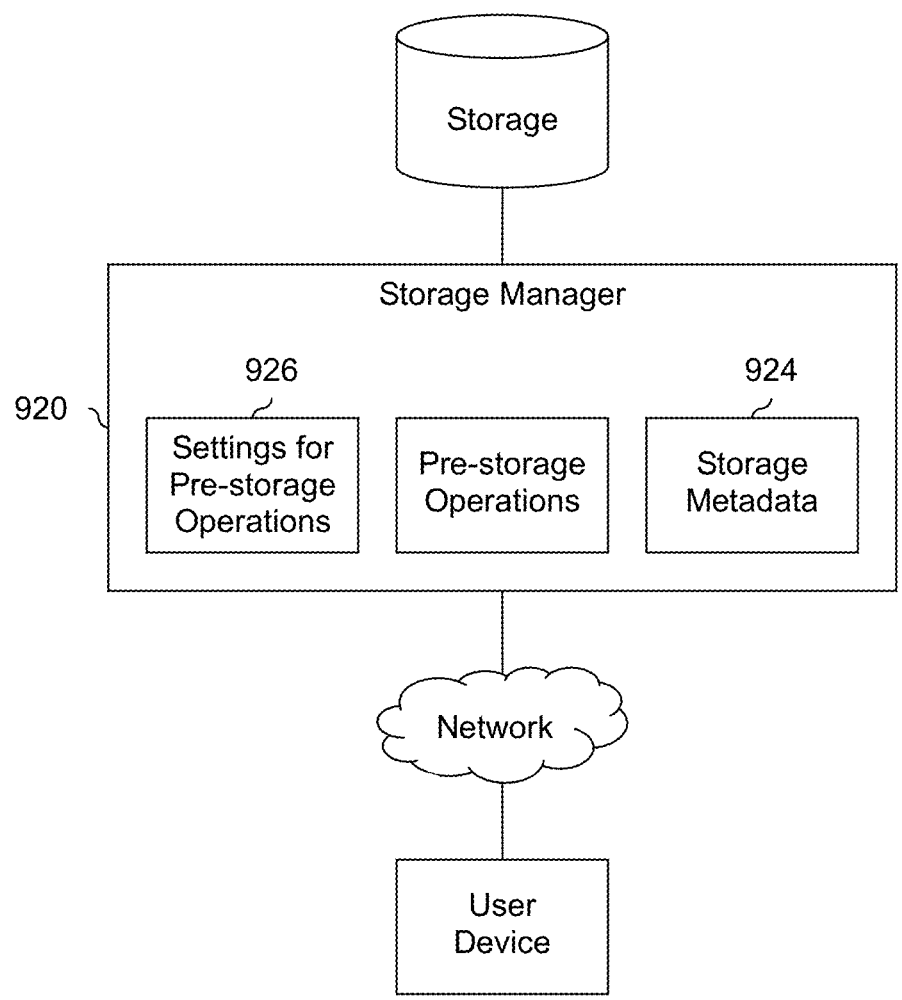
FIG. 9 is a diagram showing an embodiment of a storage system which includes settings for pre-storage operations.

FIG. 9 is a diagram showing an embodiment of a storage system which includes settings for pre-storage operations. In some embodiments, settings (which may also be referred to as configuration or preferences) for pre-storage operations may be specified (if desired) for a particular pre-storage operation associated with a particular set of data. In one example of a setting, an effort level setting (e.g., ranging from 0-9) is used to set how much effort to expend processing data prior to storage. Another setting may be block size (e.g., how large of a "chunk" of data to process at a time). If the operation is a compression operation and the system is storage poor but CPU rich, it may be desirable to set the effort level to the highest value. In some other examples, a setting is a seed or a key. If the operation is an auditing operation, then the setting may be an auditing server to which the data is forwarded. A setting may be any input or configuration used by an operation.

In the example shown, settings for pre-storage operations 926 is used by storage manager 920 to store pre-storage settings (if any); storage manager 920 records in storage metadata 924 if there are any settings to be used when processing data prior to storage. In one example, two columns are created and both are associated with the compression operation, zlib, because of their data type. However, the first column is explicitly associated with the compression setting "effort level=9" whereas the second column has no compression setting explicitly associated with it. Storage metadata 924 would record that there is a setting for the first column and that there is no setting for the second column of data.

Figure 10:
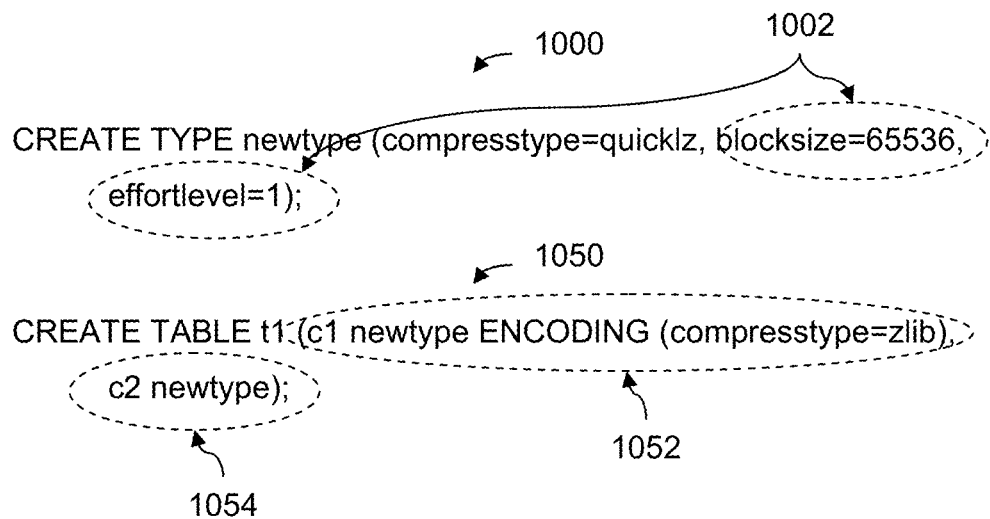
FIG. 10 is a diagram showing an embodiment of a create statement which includes a block size setting and an effort level setting.

FIG. 10 is a diagram showing an embodiment of a create statement which includes a block size setting and an effort level setting. In the example shown, create statement 1000 is used to create a new data type, newtype. The newtype data type is associated with the QuickLZ compression operation and clause 1002 includes the settings "blocksize=65536" and "effortlevel=1" for the newtype data type.

Create command 1050 creates table t1 with two columns. Clause 1052 explicitly associates the first column (i.e., c1) with the zlib compression operation. However, because the data type is newtype and settings are not explicitly set in clause 1052, the settings from clause 1002 (i.e., "blocksize=65536" and "effortlevel=1") will be used to process data for column c1 prior to storage.

For column c2, clause 1054 does not explicitly associate that column with any pre-storage operation or settings. As such, the QuickLZ compression operation, block size setting of 65536, and effort level of 1 inherited from the newtype data type are used for column c2.

Figure 11:
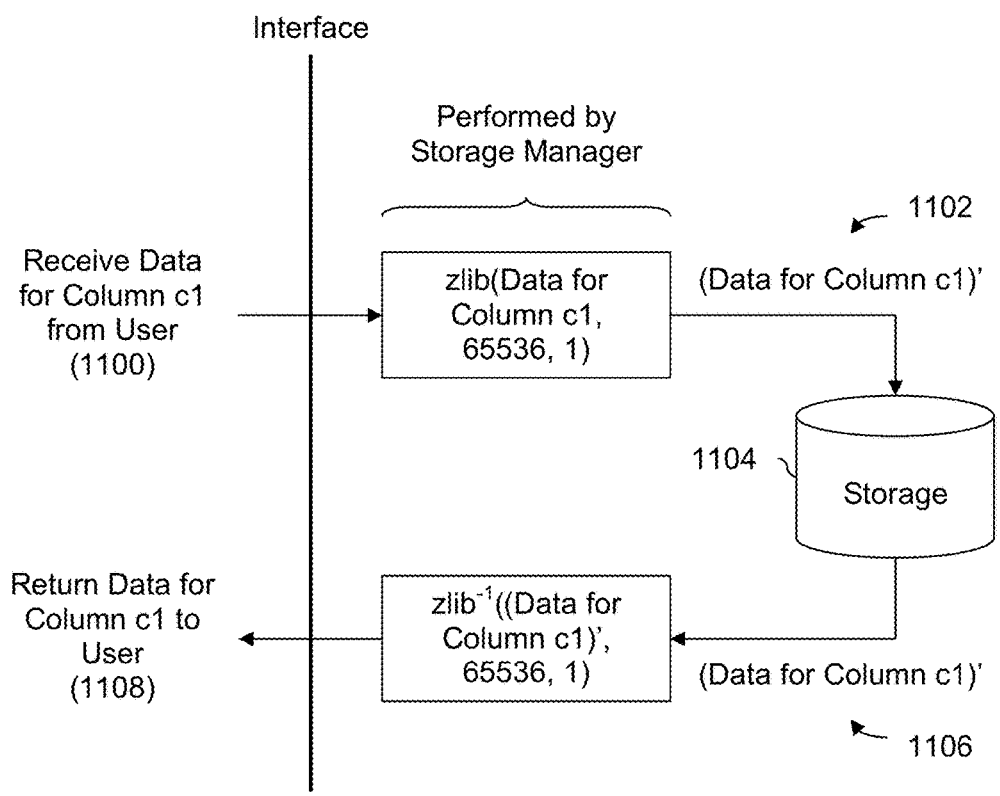
FIG. 11 is a diagram showing an embodiment of settings for pre-storage operations used to process data going to and coming from storage.

FIG. 11 is a diagram showing an embodiment of settings for pre-storage operations used to process data going to and coming from storage. The example of FIG. 11 is related to the example shown in FIG. 10. In the example shown, data for column c1 is received at 1100. A storage manager processes the data using the zlib compression operation (e.g., from clause 1052 in FIG. 10) and with block size setting of 65536 and an effort level setting of 1 (e.g., from clause 1002 in FIG. 10). The compressed data (1102) is stored in storage 1104.

In the event an indication is received to retrieve the stored data, the compressed data (1106) is retrieved from storage 1104. A storage manager performs the inverse zlib operation on the compressed data (i.e., (data for column c1)') using a block size setting of 65536 and an effort level setting of 1. For completeness and to describe the technique, this example shows the effort level setting and the block size setting being used to decompress the compressed data. In actuality, a decompression operation may not require the effort level setting and/or the block size setting (e.g., a header may contain all required information necessary to decompress the compressed data). The uncompressed, restored data (1108) is returned to the user.

In some embodiments, a storage system provides an interface for reporting of pre-storage operations, associated sets of data, create statements or other statements in which such associations are made, settings, etc. In one example, a user may wish to confirm he has set the proper pre-storage operations and/or settings for various sets of data after configuring or setting up a storage system. The following figures show some exemplary command line reporting interfaces and graphical reporting interfaces.

FIG. 12 is a diagram showing an embodiment of a command line interface of a storage system. In the example shown, the command line interface receives and operates on create statements as well as report statements. In some embodiments, a user is able to communicate with storage manager 120 in FIG. 1 using the interface shown.

At 1200, the user enters a create statement to create the newtype data type and includes a clause associating the newtype data type with the QuickLZ compression operation, a block size setting of 65536, and an effort level setting of 1. At 1202, the user enters a create statement to create table t1, which includes columns c1 and c2. The create table statement includes a clause which associates column c1 with the zlib compression operation. Both column c1 and c2 have the newtype data type.

After the newtype data type and table t1 are created respectively at 1200 and 1202, the user queries the storage system. At 1204, the user enters the command "REPORT newtype." This example command instructs the storage system to return the pre-storage operation (if any) and setting(s) (if any) for the newtype data type. The command line interface, upon receiving this report, returns "quicklz, blocksize=65536, effortlevel=1" at 1206. In some cases, a given data type may have no associated pre-storage operation and returns "None." In some embodiments, a storage manager accesses storage metadata and resolves precedence (if or as needed) prior to reporting information.

The user then enters the command "REPORT zlib" at 1208. This example command instructs the storage system to return which sets of data are associated with the zlib compression operation. The command line interface returns "c1" at 1210 (e.g., since column c2 is associated with the QuickLZ compression operation).

The user then enters the command "REPORT t1" at 1212. This example command instructs the storage system to return the pre-storage operation(s) (if any) and setting(s) (if any) for the table t1. At 1214, the command line interface returns "c1: zlib, blocksize=65536, effortlevel=1" and "c2: quicklz, blocksize=65536, effortlevel=1."

Figure 13A:
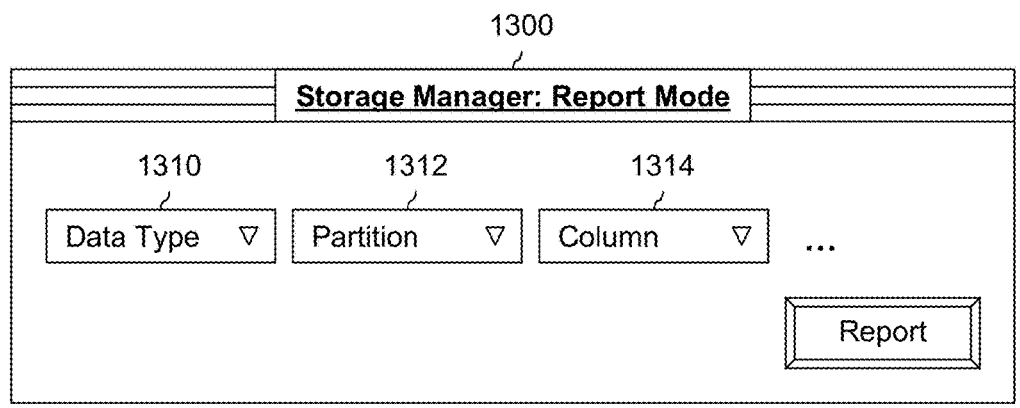
FIG. 13A is a diagram showing an embodiment of a graphical user interface for reporting information associated with pre-storage operations.

FIG. 13A is a diagram showing an embodiment of a graphical user interface for reporting information associated with pre-storage operations. In the example shown, graphical user interface 1300 includes a variety of pull down menus. Pull down menu 1310 includes data types defined in the storage system, pull down menu 1312 includes partitions defined in the storage system, and pull down menu 1314 includes columns define din the storage system. Other pull down menus (e.g., associated with any of the logical or physical containers shown in FIG. 6 or 7) may be included in graphical user interface 1300.

Figure 13B:
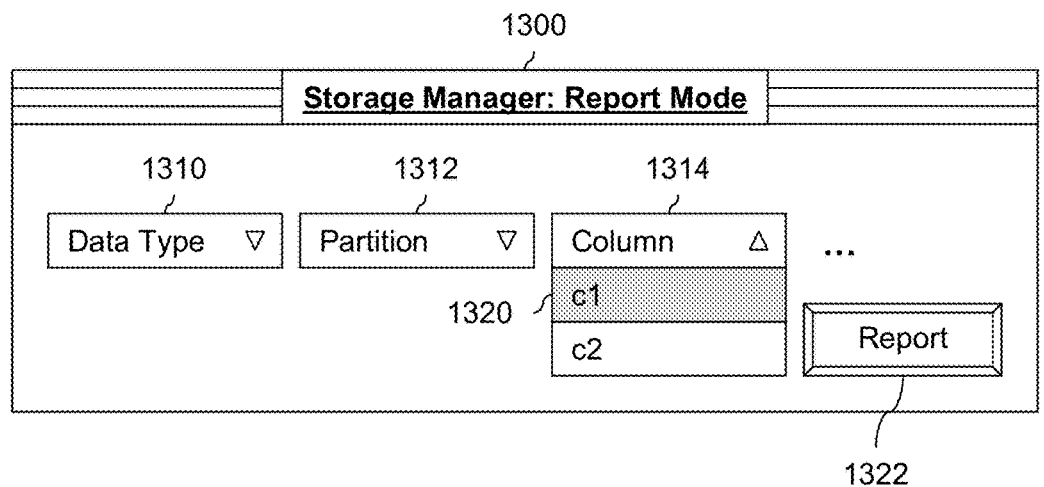
FIG. 13B is a diagram showing an embodiment of a graphical user interface with a pull down menu selected.

FIG. 13B is a diagram showing an embodiment of a graphical user interface with a pull down menu selected. In the example shown, a user has selected pull down menu 1314 from FIG. 13A and all columns defined in the system are shown. The user selects column c1 (1320) from pull down menu 1314 and presses the report button (1322).

Figure 13C:
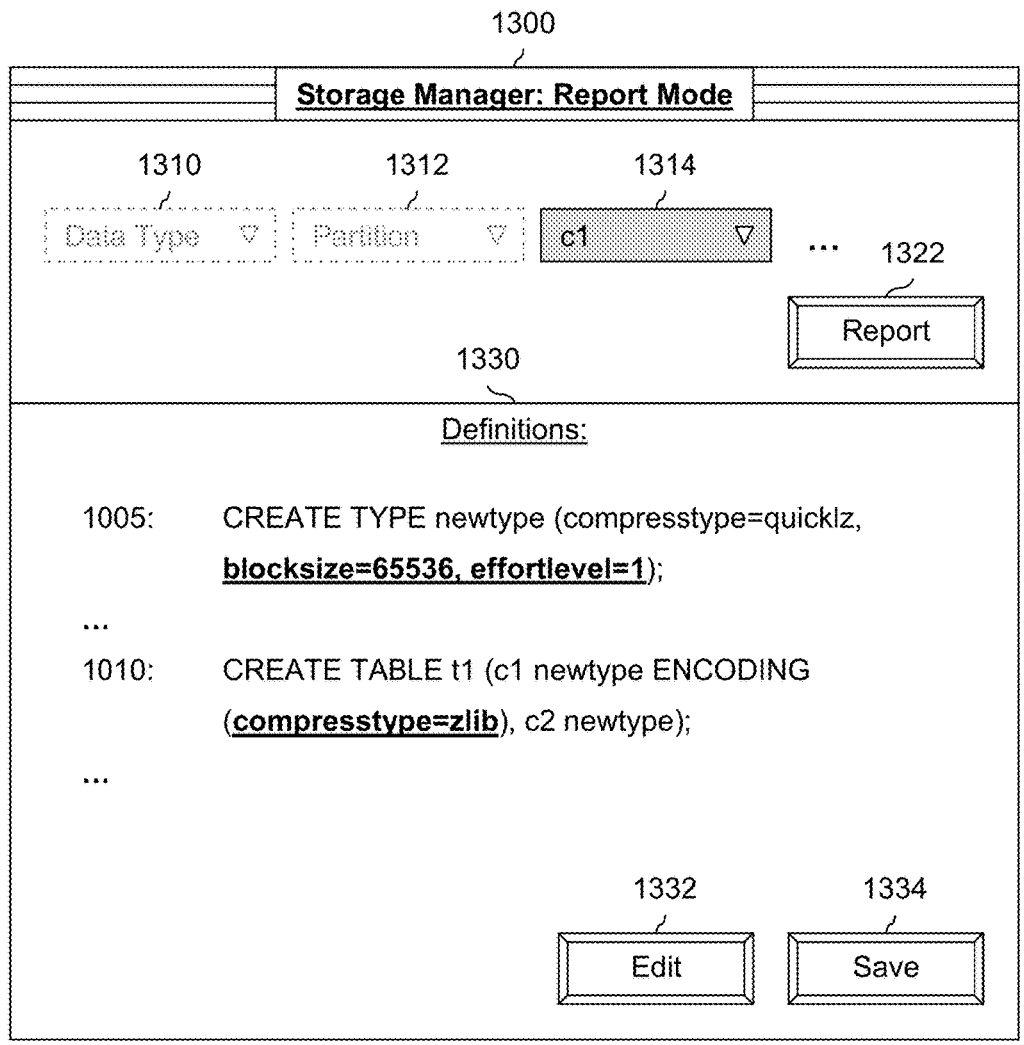
FIG. 13C is a diagram showing an embodiment of a graphical user interface which presents related statements or definitions associated with a pre-storage operation in response to a report request.

FIG. 13C is a diagram showing an embodiment of a graphical user interface which presents related statements or definitions associated with a pre-storage operation in response to a report request. In the example shown, graphical user interface 1300 is updated to include definitions window 1330 in response to selecting column c1 in pull down window 1314 and pressing the report button (1322). To indicate that column c1 is being reported on, pull down menus 1310 and 1312 are grayed out, and pull down menu 1314 (with "c1" displayed) is highlighted.

In the example shown, the clauses (including line number) which include the related definitions or statements for column c1 are shown in bold and are underlined. The block size setting of 65536 and effort level of 1 for column c1 come from the newtype data type definition at line 1005. Line 1010 includes a create statement with an explicit association between the zlib compression operation and column c1; this is also shown in definitions window 1330 in underline and bold. In some other embodiments, the reported information may be arranged or presented in some other manner. Some other visual techniques which may be used include: blinking, font color, italics, rollovers, pop ups, and so on.

In some cases, a user may find a mistake in one of the create statements, for example which caused column c1 (or some other set of data being reported on) to be associated with an undesirable or less than optimal pre-storage operation and/or setting. If desired, a user presses the edit button (1332), which causes the presented definitions in window 1330 to go from a read-only mode to a writeable mode (e.g., the heading in graphical user interface 1300 changes from "Storage Manager: Report Mode" to "Storage Manager: Edit Mode"). Once the desired changes are made, the user presses the save button (1334) to save the changes.

As shown in this example, a storage system may provide a variety of reports, including (but not limited to) what pre-storage operation and/or settings are associated with a particular set of data, what sets of data are associated with a particular pre-storage operation, where (e.g., by line number and/or from which create statement) an association or definition comes from.

In some cases, it may be desirable to show all pre-storage operations and/or settings which may be associated with a particular set of data, even if some of those pre-storage operations and/or settings are overridden by operations and/or settings with a higher precedent. A user may, for example, want to know this information when debugging a system to determine why an expected pre-storage operation is not associated with a particular set of data. The following figure shows a graphical user interface which may report such information.

Figure 13D:
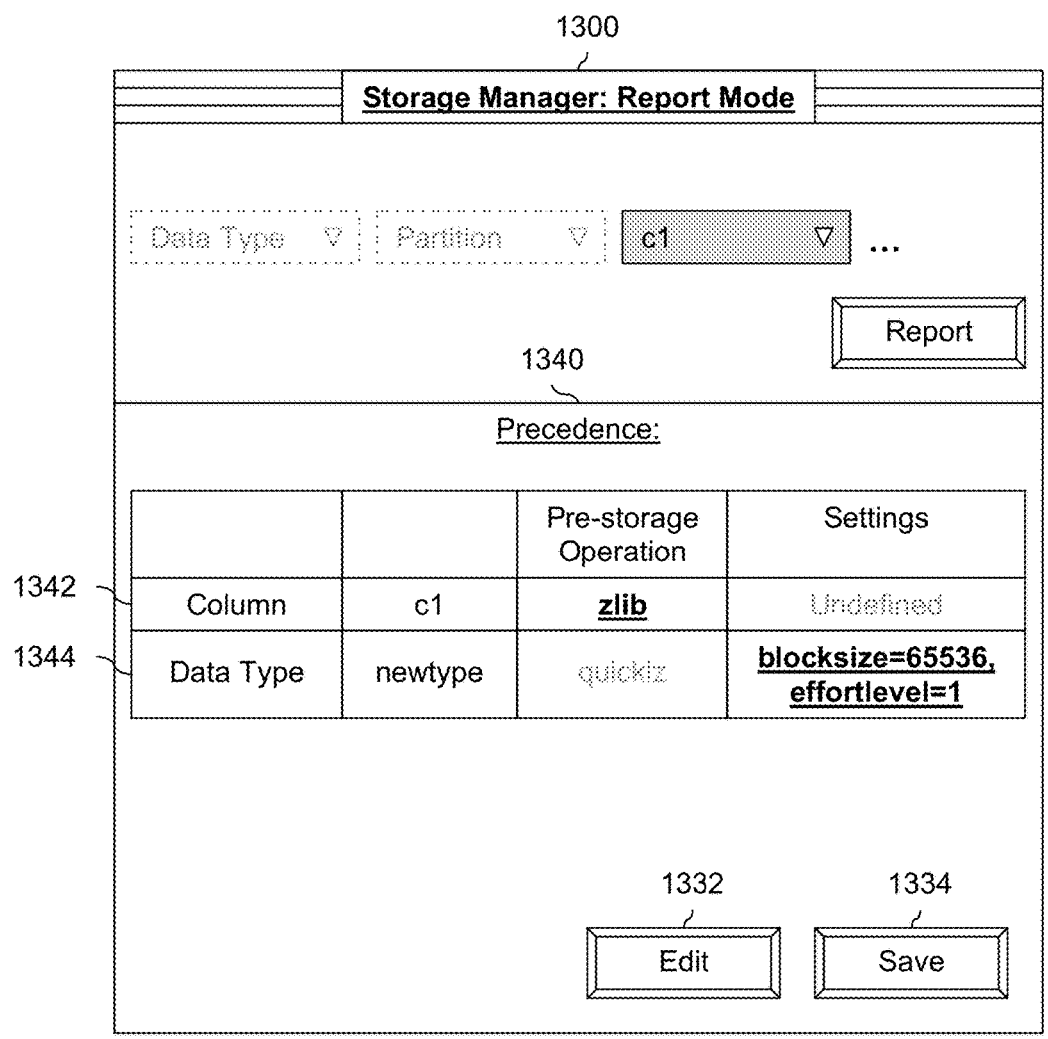
FIG. 13D is a graphical user interface which presents pre-storage operations and settings, including those which have been overridden by ones with higher precedence, in response to a report request.

FIG. 13D is a graphical user interface which presents pre-storage operations and settings, including those which have been overridden by ones with higher precedence, in response to a report request. In the example shown, precedence window 1340 includes pre-storage operations and settings for column c1, arranged according to precedence. In this example, precedence is displayed in descending order with the highest precedence at the top of list and the lowest precedence at the bottom of the list.

Row 1342 shows that column c1 is associated with the zlib pre-storage operation and has no settings associated with it ("Undefined" in this example). Row 1344 shows that the newtype data type is associated with the QuickLZ pre-storage operation and the settings "blocksize=65536" and "effortlevel=1." To indicate that the QuickLZ operation is overridden by the higher precedence zlib operation, the QuickLZ operation in row 1344 is grayed out. Similarly, the text "Undefined" in row 1342 is grayed out and shows that there are no settings coming from column c1. In this example, the pre-storage operation and settings which have the highest precedent (e.g., zlib in row 1342 and the block size and effort level settings in row 1344) are highlighted using bold and underline.

In some embodiments, pressing edit button 1332 enables a user to make changes to the displayed information. For example, after pressing edit button 1332, a user may select the grayed out "QuickLZ" in row 1344 or the underlined and bold "zlib" in row 1342 to bring up either of those definitions (e.g., in a new window or frame, present the associated create statement(s)) and edit those statements or definitions as desired. The user then presses save button 1334 to save the changes.

In some embodiments, graphical user interface 1300 provides a pull down menu (not shown) to make edits to the reported information easier. For example, selecting the grayed out "Undefined" in row 1342 may bring up two pull downs listing all possible settings: one pull down with all possible block size settings and one pull down with all possible effort level settings. The user selects the desired setting(s) using the pull down(s). If save button 1334 is pressed, graphical user interface 1300 makes the appropriate changes in the backend (e.g., to a create table statement in which column c1 is defined). This may prevent typographical errors by the user (e.g., missing a semicolon or closing parenthesis in a create table statement) and does not require the user to have knowledge of the syntax used to create and/or define objects in the database.

In some embodiments (e.g., where there are multiple databases and/or a given database includes multiple tables), column names include their respective database and/or tables. For example, column c1 may be presented as "db1:t2:c1" instead of just "c1."

For simplicity, only column level and data type pre-storage operations and settings are shown in this example. In some other embodiments, a graphical user interface may present additional and/or other levels of precedence (see, e.g., precedence list 800 in FIG. 8). In some embodiments, a presented list of precedence may include all levels, for example so that a user is able to learn about all possible levels of specification.

In some embodiments, the graphical user interface shown herein is presented in response to pressing report button 1322 in FIG. 13B. In some embodiments, a user has the ability to switch back and forth between the state shown in FIG. 13C and the state shown in FIG. 3D (e.g., via a "Show Precedence" button and a "Show Definitions" button).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a tangible processor; and
a tangible memory coupled with the tangible processor, wherein the memory is configured to provide the tangible processor with instructions which when executed cause the tangible processor to:
  receive: (1) a specified data type and (2) a specified pre-storage operation;
  in response to receiving the specified data type and the specified pre-storage operation, create an association between the specified data type and the specified pre-storage operation in storage metadata;
  after the association between the specified data type and the specified pre-storage operation is created, receive data to be stored, wherein the data to be stored has a data type;
  in response to receiving the data to be stored:
    access the storage metadata, including the association between the specified data type and the specified pre-storage operation;
    determine when the data type of the data to be stored is the same as the specified data type; and
    in the event it is determined that the data type of the data to be stored is the same as the specified data type:
      perform the specified pre-storage operation on the data to be stored in order to obtain an output of the specified pre-storage operation; and
      store the output of the specified pre-storage operation;
  provide a graphical user interface which is configured to:
    after the association between the specified data type and the specified pre-storage operation is created, receive a report request associated with the specified data type; and
    in response to receiving the report request:
      access the storage metadata, including the association between the specified data type and the specified pre-storage operation; and
      display that the specified pre-storage operation is associated with the specified data type, including by displaying a clause that includes the specified data type and the specified pre-storage operation, wherein the clause includes one or more of the following: a definition of a data type or a create statement;
  receive: (1) a specified role and (2) a second specified pre-storage operation, wherein the data to be stored is further associated with a role;
  in response to receiving the specified role and the second specified pre-storage operation, create a second association between the specified role and the second specified pre-storage operation in the storage metadata;
  after the second association is created, receive a second piece of data to be stored, wherein the second piece of data has a data type and is associated with a role; and
  in response to receiving the second piece of data:
    determine when the data type of the second piece of data is the same as the specified data type;
    determine when the role of the second piece of data is the same as the specified role;
    in the event it is determined that: (1) the data type of the second piece of data is the same as the specified data type and (2) the role of the second piece of data is the same as the specified role:
      perform the specified pre-storage operation on the second piece of data in order to obtain an output of the specified pre-storage operation on the second piece of data; and
      store the output of the specified pre-storage operation on the second piece of data;
    in the event it is determined that: (1) the data type of the second piece of data is different from the specified data type and (2) the role of the second piece of data is the same as the specified role:
      perform the second specified pre-storage operation on the second piece of data in order to obtain an output of the second specified pre-storage operation on the second piece of data; and
      store the output of the second specified pre-storage operation;
    in the event it is determined that: (1) the data type of the second piece of data is the same as the specified data type and (2) the role of the second piece of data is different from the specified role:
      perform the specified pre-storage operation on the second piece of data in order to obtain an output of the specified pre-storage operation on the second piece of data; and
      store the output of the specified pre-storage operation on the second piece of data; and
    in the event it is determined that: (1) the data type of the second piece of data is different from the specified data type and (2) the role of the second piece of data is different from the specified role, determine a pre-storage operation to perform on the second piece of data including by using an order of precedence defined by a list.

2. The system recited in claim 1, wherein displaying that the specified pre-storage operation is associated with the specified data type further includes:
displaying any pre-storage operations which have been overridden by other pre-storage operations with a higher precedence.

3. The system recited in claim 1, wherein the graphical user interface is further configured to:
receive a save request which includes a new pre-storage operation to associate with the specified data type; and
in response to receiving the save request, access the storage metadata, including the association between the specified data type and the specified pre-storage operation, in order to replace the specified pre-storage operation with the new pre-storage operation in the association.

4. The system recited in claim 3, wherein:
the graphical user interface is further configured to provide a pull down menu which includes a plurality of pre-storage operations; and the new pre-storage operation included in the save request is selected from the plurality of pre-storage operations using the pull down menu.

5. A computer-implemented method, comprising:

receiving: (1) a specified data type and (2) a specified pre-storage operation;

in response to receiving the specified data type and the specified pre-storage operation, creating an association between the specified data type and the specified pre-storage operation in storage metadata;

after the association between the specified data type and the specified pre-storage operation is created, receiving data to be stored, wherein the data to be stored has a data type;

in response to receiving the data to be stored:
  accessing the storage metadata, including the association between the specified data type and the specified pre-storage operation;
  determining when the data type of the data to be stored is the same as the specified data type; and
  in the event it is determined that the data type of the data to be stored is the same as the specified data type:
    performing the specified pre-storage operation on the data to be stored, using a tangible processor, in order to obtain an output of the specified pre-storage operation; and
    storing the output of the specified pre-storage operation;

providing a graphical user interface which is configured to:
  after the association between the specified data type and the specified pre-storage operation is created, receive a report request associated with the specified data type; and
  in response to receiving the report request:
    access the storage metadata, including the association between the specified data type and the specified pre-storage operation; and
    display that the specified pre-storage operation is associated with the specified data type, including by displaying a clause that includes the specified data type and the specified pre-storage operation, wherein the clause includes one or more of the following: a definition of a data type or a create statement;

receiving: (1) a specified role and (2) a second specified pre-storage operation, wherein the data to be stored is further associated with a role;

in response to receiving the specified role and the second specified pre-storage operation, creating a second association between the specified role and the second specified pre-storage operation in the storage metadata;

after the second association is created, receiving a second piece of data to be stored, wherein the second piece of data has a data type and is associated with a role; and in response to receiving the second piece of data:
  determining when the data type of the second piece of data is the same as the specified data type;
  determining when the role of the second piece of data is the same as the specified role;
  in the event it is determined that: (1) the data type of the second piece of data is the same as the specified data type and (2) the role of the second piece of data is the same as the specified role:
    performing the specified pre-storage operation on the second piece of data in order to obtain an output of the specified pre-storage operation on the second piece of data; and
    storing the output of the specified pre-storage operation on the second piece of data;
  in the event it is determined that: (1) the data type of the second piece of data is different from the specified data type and (2) the role of the second piece of data is the same as the specified role:
    performing the second specified pre-storage operation on the second piece of data in order to obtain an output of the second specified pre-storage operation on the second piece of data; and
    storing the output of the second specified pre-storage operation;
  in the event it is determined that: (1) the data type of the second piece of data is the same as the specified data type and (2) the role of the second piece of data is different from the specified role:
    performing the specified pre-storage operation on the second piece of data in order to obtain an output of the specified pre-storage operation on the second piece of data; and
    storing the output of the specified pre-storage operation on the second piece of data; and
  in the event it is determined that: (1) the data type of the second piece of data is different from the specified data type and (2) the role of the second piece of data is different from the specified role, determining a pre-storage operation to perform on the second piece of data including by using an order of precedence defined by a list.

6. The method recited in claim 5, wherein displaying that the specified pre-storage operation is associated with the specified data type further includes:
  displaying any pre-storage operations which have been overridden by other pre-storage operations with a higher precedence.

7. The method recited in claim 5, wherein the graphical user interface is further configured to:
  receive a save request which includes a new pre-storage operation to associate with the specified data type; and
  in response to receiving the save request, access the storage metadata, including the association between the specified data type and the specified pre-storage operation, in order to replace the specified pre-storage operation with the new pre-storage operation in the association.

8. The method recited in claim 7, wherein:
  the graphical user interface is further configured to provide a pull down menu which includes a plurality of pre-storage operations; and
  the new pre-storage operation included in the save request is selected from the plurality of pre-storage operations using the pull down menu.

9. A computer program product, the computer program product being embodied in a non-transitory computer readable storage medium and comprising computer instructions for:
  receiving: (1) a specified data type and (2) a specified pre-storage operation;
  in response to receiving the specified data type and the specified pre-storage operation, creating an association between the specified data type and the specified pre-storage operation in storage metadata;

after the association between the specified data type and the specified pre-storage operation is created, receiving data to be stored, wherein the data to be stored has a data type;

in response to receiving the data to be stored:
  accessing the storage metadata, including the association between the specified data type and the specified pre-storage operation;
  determining when the data type of the data to be stored is the same as the specified data type; and
  in the event it is determined that the data type of the data to be stored is the same as the specified data type:
    performing the specified pre-storage operation on the data to be stored, using a tangible processor, in order to obtain an output of the specified pre-storage operation; and
    storing the output of the specified pre-storage operation;

providing a graphical user interface which is configured to:
  after the association between the specified data type and the specified pre-storage operation is created, receive a report request associated with the specified data type; and
  in response to receiving the report request:
    access the storage metadata, including the association between the specified data type and the specified pre-storage operation; and
    display that the specified pre-storage operation is associated with the specified data type, including by displaying a clause that includes the specified data type and the specified pre-storage operation, wherein the clause includes one or more of the following: a definition of a data type or a create statement;

receiving: (1) a specified role and (2) a second specified pre-storage operation, wherein the data to be stored is further associated with a role;

in response to receiving the specified role and the second specified pre-storage operation, creating a second association between the specified role and the second specified pre-storage operation in the storage metadata;

after the second association is created, receiving a second piece of data to be stored, wherein the second piece of data has a data type and is associated with a role; and in response to receiving the second piece of data:
  determining when the data type of the second piece of data is the same as the specified data type;
  determining when the role of the second piece of data is the same as the specified role;
  in the event it is determined that: (1) the data type of the second piece of data is the same as the specified data type and (2) the role of the second piece of data is the same as the specified role:
    performing the specified pre-storage operation on the second piece of data in order to obtain an output of the specified pre-storage operation on the second piece of data; and
    storing the output of the specified pre-storage operation on the second piece of data;
  in the event it is determined that: (1) the data type of the second piece of data is different from the specified data type and (2) the role of the second piece of data is the same as the specified role:
    performing the second specified pre-storage operation on the second piece of data in order to obtain an output of the second specified pre-storage operation on the second piece of data; and
    storing the output of the second specified pre-storage operation;
  in the event it is determined that: (1) the data type of the second piece of data is the same as the specified data type and (2) the role of the second piece of data is different from the specified role:
    performing the specified pre-storage operation on the second piece of data in order to obtain an output of the specified pre-storage operation on the second piece of data; and
    storing the output of the specified pre-storage operation on the second piece of data; and
  in the event it is determined that: (1) the data type of the second piece of data is different from the specified data type and (2) the role of the second piece of data is different from the specified role, determining a pre-storage operation to perform on the second piece of data including by using an order of precedence defined by a list.

10. The computer program product recited in claim 9, wherein displaying that the specified pre-storage operation is associated with the specified data type further includes:
  displaying any pre-storage operations which have been overridden by other pre-storage operations with a higher precedence.

11. The computer program product recited in claim 9, wherein the graphical user interface is further configured to:
  receive a save request which includes a new pre-storage operation to associate with the specified data type; and
  in response to receiving the save request, access the storage metadata, including the association between the specified data type and the specified pre-storage operation, in order to replace the specified pre-storage operation with the new pre-storage operation in the association.

12. The computer program product recited in claim 11, wherein:
  the graphical user interface is further configured to provide a pull down menu which includes a plurality of pre-storage operations; and
  the new pre-storage operation included in the save request is selected from the plurality of pre-storage operations using the pull down menu.

* * * * *